United States Patent [19]

Hayward

[11] 4,116,183

[45] Sep. 26, 1978

[54] FUEL ATOMIZING UNIT WITH OVEN CHAMBER

[75] Inventor: Arthur Hayward, Bronx, N.Y.

[73] Assignee: Electronic Fuel Saver, Inc., Bronx, N.Y.

[21] Appl. No.: 792,681

[22] Filed: May 2, 1977

Related U.S. Application Data

[63] Continuation-in-part of Ser. No. 587,846, Jun. 18, 1975, Pat. No. 4,020,812.

[51] Int. Cl.² .......................................... F02M 31/00
[52] U.S. Cl. .............................. 123/122 F; 219/206; 219/207; 261/142
[58] Field of Search ............... 123/122 F; 219/206, 219/207; 261/142

[56] References Cited

U.S. PATENT DOCUMENTS

| | | | |
|---|---|---|---|
| 1,380,824 | 6/1921 | Mies | 219/206 |
| 1,387,276 | 8/1921 | Kutsche | 219/207 |
| 1,484,617 | 2/1924 | Aske | 219/206 |

*Primary Examiner*—Ronald H. Lazarus

*Attorney, Agent, or Firm*—Michael Ebert

[57] ABSTRACT

A fuel atomizing unit interposable in a conduit feeding a relatively cold mixture of fuel droplets dispersedd in air to a combustion chamber. The unit includes a permeable assembly constituted by an electrical heating element disposed between a pair of spaced mesh screens to define an atomization zone. The assembly is seated in a cavity formed in a metal plate having a flow passage which registers with the flow conduit, the plate acting as a heat sink and being sandwiched between thermal insulation gaskets to render the plate effective as an oven chamber to maintain the atomization zone at an elevated temperature despite the varying cooling effect of the incoming mixture. The zone restricts the flow of the mixture, the screen intercepting the droplets therein to create a suspension of minute fuel particles to produce a downstream mist. The heat supplied to the zone by the oven chamber is sufficient to raise the temperature of the mist to a level conducive to complete combustion in the combustion chamber, whereby no fuel is wasted and the exhaust is substantially free of pollutants.

8 Claims, 5 Drawing Figures

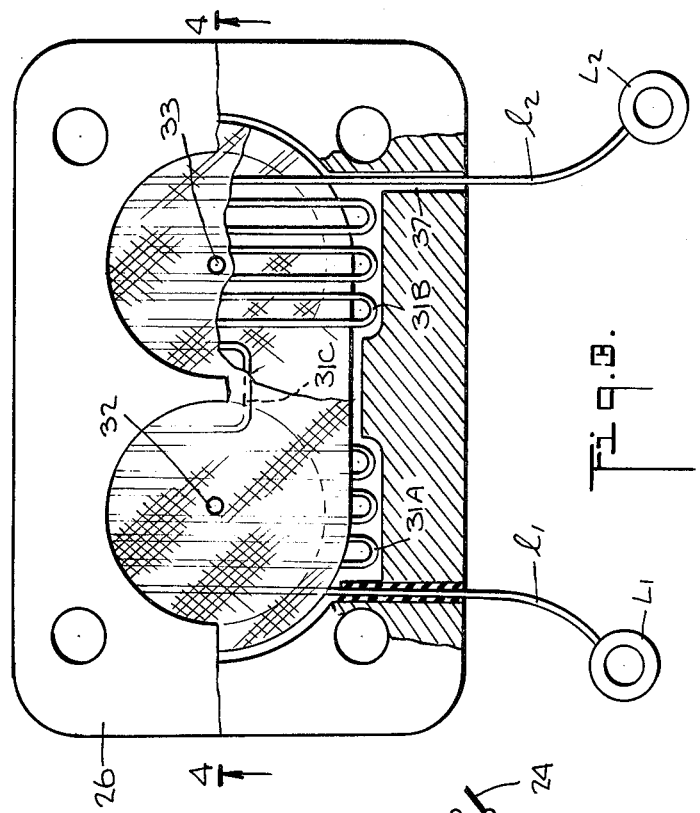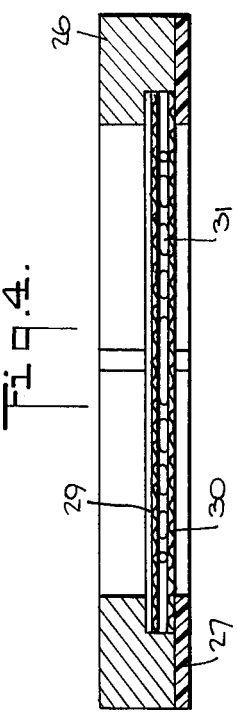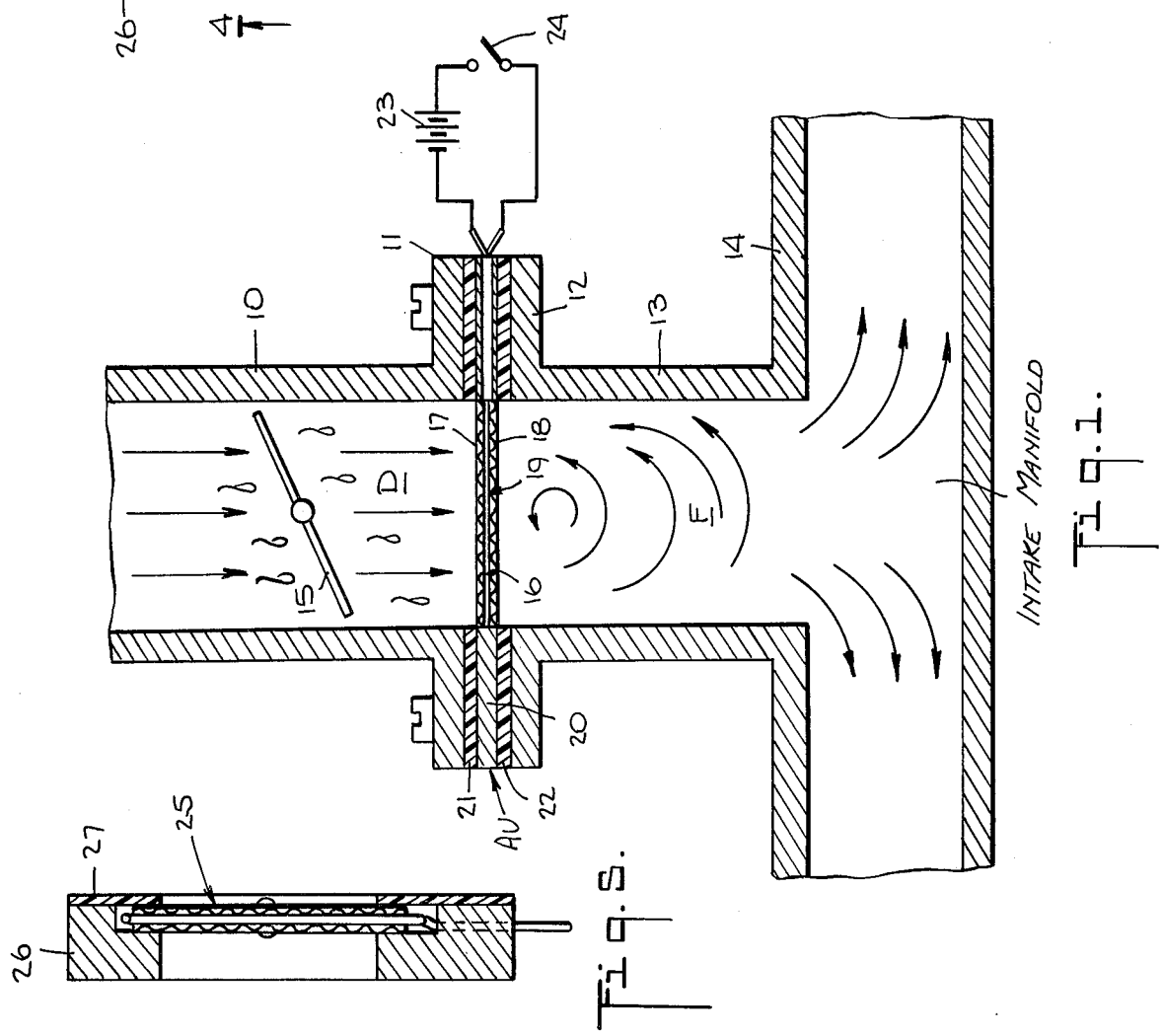

FUEL ATOMIZING UNIT WITH OVEN CHAMBER

RELATED APPLICATION

This application is a continuation-in-part of my copending application Ser. No. 587,846 and now U.S. Pat. No. 4,020,812, filed June 18, 1975, entitled "Fuel Atomizing Unit."

BACKGROUND OF INVENTION

This invention relates generally to apparatus for atomizing fuel supplied to the combustion chamber of an engine or furnace, and more particularly to a fuel-atomizing unit adapted to be interposed between the carburetor and intake manifold of an internal-combustion engine and serving to convert an incoming fuel-air mixture into a mist which is heated to a level conducive to complete combustion in the chamber.

The modern era is marked by a growing concern with the inadequate supply of fuel and the rising cost thereof, as well as with the ecological damage resulting from the emission of pollutants from fuel-burning engines and furnaces. Hence while there is a strong international interest in reducing pollutants emanating from automobiles and oil burners, there is at the same time a great desire to effect economies in fuel consumption to conserve the available fuel.

Many expedients heretofore suggested to control pollution have been at the expense of fuel economy. For example, catalytic converters which are designed for installation in the exhaust of a vehicle to cut down the emission of pollutants have an adverse effect on the efficiency of the engine and cause the engine to burn more gasoline. Thus whatever is gained in ecological terms is contradicted by significant economic losses.

In an internal combustion engine, the pollutants are constituted by oxides of nitrogen, unburned hydrocarbons and carbon monoxide. But it is not only the emission from the engine exhaust into the atmosphere which creates an ecological problem, for the emitted substances give rise to chemical reactions in the atmosphere when radiant energy is supplied thereto by the sun. Thus the smog now encountered in many major cities is largely the result of photochemical reactions involving unburned hydrocarbons from automobile exhausts. These unburned hydrocarbons are also responsible for inefficient engine operation, in that carbon deposits are formed on the walls of combustion chambers.

Thus with existing internal-combustion engines, a measurable portion of the fuel supplied thereto remains unburned and is discharged. This not only results in an uneconomical engine operation, but it also contaminates the atmosphere.

Attempts have heretofore been made to interpose an atomizer between the carburetor and the intake of the engine to insure complete combustion of the fuel. For example, U.S. Pat. No. 3,544,290 discloses a unit in the form of a strainer for the fuel-air mixture operating in conjunction with a vibrator to agitate the mixture in order to effect atomization thereof. Similar attempts to homogenize the air-gas mixture are disclosed in U.S. Pat. Nos. 1,260,699 and 1,035,614. In U.S. Pat. Nos. 3,899,949 and 1,380,824, use is made of screen members in conjunction with heaters to vaporize the fuel. But in all instances, the arrangements disclosed in the prior art possess certain practical drawbacks which have militated against their general commercial acceptance.

In my above-identified copending application (to be granted as U.S. Pat. No. 4,020,812 on May 3, 1977), there is disclosed an improved atomizing unit serving to homogenize and heat the fuel mixture fed into the combustion chamber of an engine or any fuel burner so that complete combustion thereof takes place, thereby making maximum use of the available fuel and minimizing the emission of unburned fuel constituents.

In the unit disclosed in my copending application, the entire disclosure of which is incorporated herein by reference, the unit is designed to be interposed in a conduit feeding a relatively cold mixture of fuel droplets dispersed in an air stream to a combustion chamber for ignition therein. The unit includes a pair of parallel mesh screens having an electrical heating element in the space therebetween to define a zone which restricts the flow of the air-fuel mixture, the screen dissecting the droplets to develop in the output of a unit a fog-like suspension of atomized fuel particles in air.

The heating element is energized to heat the zone to a temperature level which in free air exceeds 500° F., the heat causing the fog in the output of the unit to attain a temperature level of about 90° F. to promote vaporization thereof before it enters the combustion chamber.

The screens and the heater are held in spaced relation within a stack of electrically insulating heat-resistant gaskets having an opening therein for the passage of the mixture, the stack including a metal gasket acting as a heat sink to prevent excessive heating that might otherwise burn out the unit.

In order to avoid leakage of the air-fuel mixture from the unit, the gaskets in the stack are laminated together by a bonding agent. However, because of chemical reactions resulting from the presence of gasoline and the heat involved, some degree of delamination is experienced with prolonged use of the unit, and leaks are developed which degrade the efficiency of the carburetion system. Moreover, a unit which requires a stack of gaskets which must be interlaminated is relatively inexpensive to manufacture.

Another problem encountered with a unit of the type disclosed in my prior application relates to the insulation of the heater wire; for the inorganic ceramic coating thereon is relatively brittle. As a consequence, when the heater wire is subjected to vibratory or shock forces, the insulation may crack and break off, and the uninsulated wire may then make contact with the wire mesh screen and short out the heater.

SUMMARY OF INVENTION

In view of the foregoing, it is the main object of this invention to provide an improved fuel atomizing unit serving to homogenize and oven-heat the fuel mixture fed into the combustion chamber of an engine or burner so that complete combustion thereof takes place, thereby making maximum use of the available fuel and minimizing the emission of unburned fuel constituents.

More particularly, it is an object of this invention to provide an atomizing unit which is of simple, low-cost and durable design, which unit is adapted to be interposed between the mounting flange of a carburetor and the complementary flange of an intake manifold, whereby the unit may be quickly installed and replaced when necessary without difficulty.

Also an object of this invention is to provide a unit of the above-noted type which incorporates a heater energized by the battery of the vehicle in which the unit is installed, the heater serving to heat an oven surrounding a zone through which the incoming mixture passes, thereby elevating the temperature of the fuel-air mixture to a desired level conducive to vaporization. The heater is of low wattage, so that little current is drawn and the load imposed on the battery is insignificant.

Still another object of this invention is to provide an atomizing unit which functions reliably and efficiently to convert a relatively cold fuel-air mixture in which droplets of fuel are dispersed in air into a heated fog in which minute particles of fuel are suspended in air, whereby admitted into the combustion chamber of the engine, furnace or other combustion chamber is a highly inflammable gas devoid of droplets, thereby promoting complete combustion and obviating the waste of fuel.

A significant advantage of the invention as applied to an automobile engine, apart from providing a significant increase in gas mileage and lowering the emission of pollutants, is the improvement in start-up characteristics; for the invention makes possible a rapid start-up even under extremely cold conditions. While the invention will be described herein in conjunction with automobile engines, it will be recognized that it is equally applicable to marine and aircraft internal-combustion engines as well as to furnaces and other devices having combustion chambers which are fueled by kerosene, gasoline, or any other hydrocarbon intermixed with air.

Briefly stated, these objects are attained in an atomizing unit adapted to be interposed in a conduit feeding a relatively cold mixture of fuel droplets dispersed in an airstream to a combustion chamber for ignition therein.

The unit is constituted by an electrical heating element held between a pair of spaced mesh screens to define a permeable assembly having an atomization zone therein through which the air/fuel mixture passes. The assembly is seated within a cavity in a metal plate having a flow passage which registers with the conduit, the plate acting as a heat sink and being sandwiched between thermal insulation gaskets to render the plate effective as an oven chamber to maintain the zone at an elevated temperature despite the varying cooling effect of the incoming mixture.

The atomization zone acts as a restriction in the flow passage in which the screens intercept and atomize the droplets, thereby creating a suspension of minute fuel particles in air to produce a downstream mist or fog which is forced by the restriction to assume a vortex-like flow pattern. The heat supplied to the zone by the oven chamber is sufficient to raise the temperature of the fog in the output of the unit to a level conducive to complete combustion when the fog reaches the combustion chamber, thereby minimizing fuel waste and the emission of pollutants.

OUTLINE OF DRAWINGS

For a better understanding of the invention as well as other objects and further features thereof, reference is made to the following detailed description to be read in conjunction with the accompanying drawings, wherein:

FIG. 1 is a schematic illustration in section of a carburetor coupled to the intake manifold of an internal-combustion engine, with an atomizer unit in accordance with the invention interposed between the carburetor and the intake manifold;

FIG. 3 is a plan view of the actual unit;

FIG. 4 is a longitudinal section taken through the unit in the plane indicated by line 4—4 in FIG. 3;

FIG. 5 is a transverse section taken through the unit in the plane indicated by line 5—5 in FIG. 3.

DESCRIPTION OF INVENTION

General Principles

Figure 2:
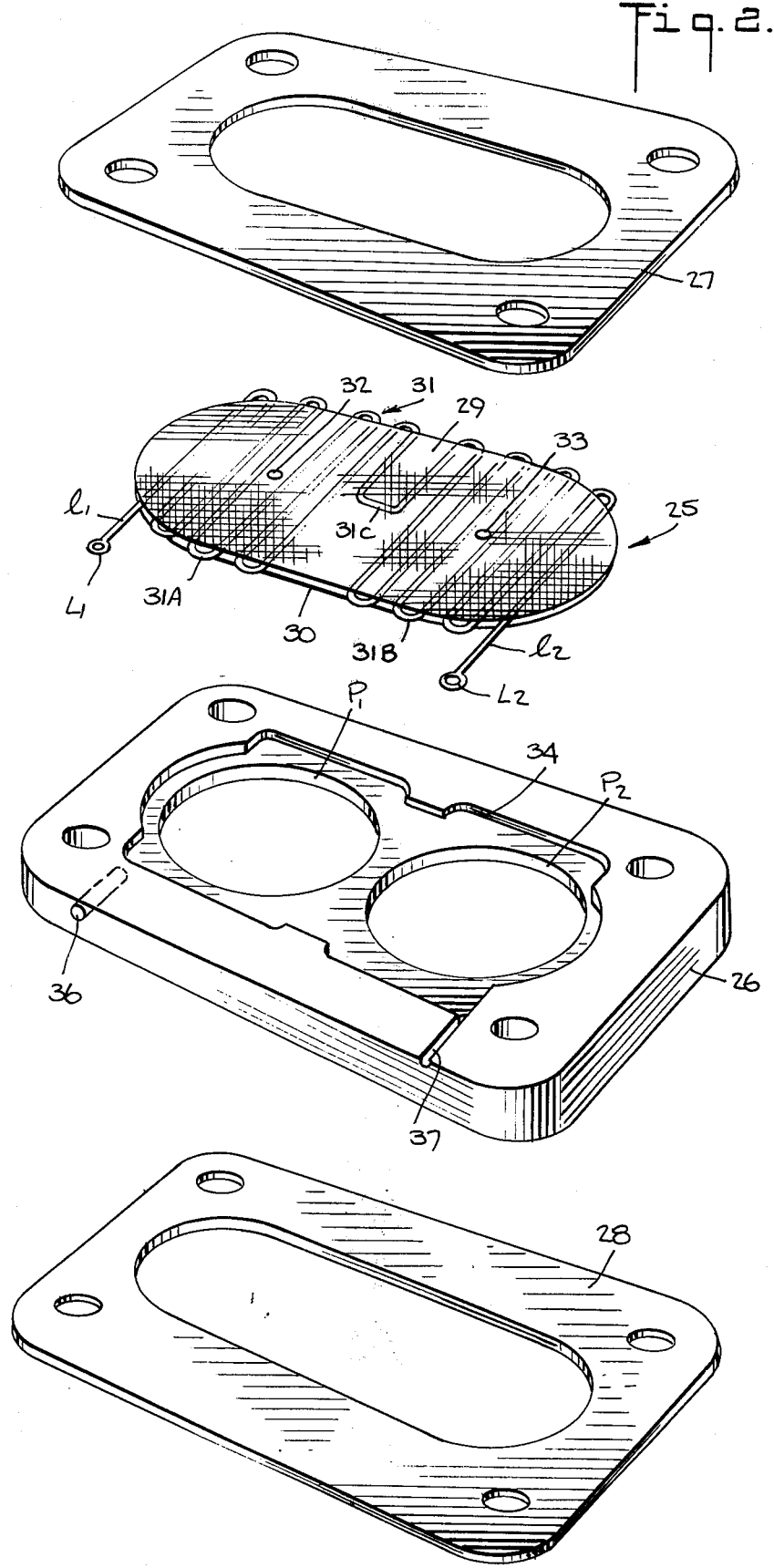
FIG. 2 is an exploded view of one preferred embodiment of an atomizing unit of the dual assembly type in accordance with the invention.

Referring now to FIG. 1, there is schematically illustrated the arrangement found in a conventional internal-combustion engine having a standard carburetor serving to generate the fuel-air mixture needed to power the engine. Only the throat 10 of the carburetor is shown, the throat having a mounting flange 11 which is bolted to a complementary flange 12 on the inlet pipe 13 of an intake manifold 14 leading to the cylinders or combustion chambers of the engine. Thus the throat 10 and inlet pipe 11 form a conduit for the fuel-air mixture. Interposed between flanges 11 and 12 and clamped therebetween is an atomizing unit AU in accordance with the invention.

In the carburetor, hydrocarbon fuel or gasoline is dispersed as tiny droplets D in a stream of air. In a conventional arrangement lacking an atomizer unit, as a result of heat absorption on the way to the cylinders these droplets are vaporized, so that the mixture then becomes an inflammable gas. The vapor-air mixture thus formed enters the combustion chambers of the cylinders where it is ignited to produce explosive forces for driving the pistons. A throttle valve 15 is disposed within the throat of the carburetor, this valve being operated by the accelerator pedal.

One reason a conventional carburetor system in an internal-combustion engine is wasteful of fuel is that the efficiency of mixing depends on atomizing the fuel into minute particles. But with a standard carburetor, many of the particles or droplets of the fuel are relatively coarse, thereby avoiding adequate contact with the air so that the droplets go through the engine unburned.

Another reason why a significant portion of the fuel supplied to the engine is dissipated is that the mixture yielded by the carburetor is quite cold; and while it is heated in the course of its passage to the combustion chambers by heat absorption, the fuel is not always fully vaporized. Indeed, the mouth of a carburetor at the intake manifold is generally quite cold, so that in an aircraft internal combustion engine ice is often formed in this region.

The atomizing unit AU in accordance with the invention is provided with a permeable assembly constituted by an electrical heater element in the form of a resistance wire 16 placed in the space between a pair of parallel mesh screens 17 and 18 to define an atomization zone 19 therein. The assembly is seated within a cavity formed in a metal plate 20 having a flow passage therein in registration with the conduit, atomization zone 19 acting as a restriction in this flow passage. The restriction preferably has an impedance to flow which is in the order of 15 to 20%.

Metal plate 20, which is preferably of aluminum or other metal capable of functioning efficiently as a heat sink to absorb and retain heat produced by the heater wire, is sandwiched between a pair of gaskets 21 and 22 formed of thermal insulation material such as asbestos. Thus dissipation of heat from the exterior of the plate is effectively limited to the narrow edge thereof. The rate of heat loss is very low, so that the plate acts as an oven chamber to maintain the heat within zone 19, despite the passage therethrough of the cold fuel/air mixture.

The droplets D in the mixture passing through the assembly are intercepted by the screen meshes of the assembly and are dissected thereby to form minute fuel particles which are suspended in the airstream to produce a downstream mist or fog F. It is well-known that under certain circumstances the introduction of a restriction in a flow conduit may change the character of the flow and influence the downstream flow pattern. Thus while in the absence of the restriction, the air flow pattern is essentially laminar, the presence of the restriction results in downstream turbulence to create vortices.

The reason the downstream vortices produced by the atomizing unit is beneficial is that these vortices effectively prolong the path between the carburetor and the combustion chambers in the cylinders and thereby lengthen the period during which heat is absorbed to volatilize the fuel.

The cold mixture issuing from the carburetor is heated in zone 19 by the casing oven heater 16 which is connected to the battery 23 of the vehicle, so that when the ignition switch 24 of the vehicle is turned on, the heater is immediately energized. Thus the zone is heated before fuel is supplied to the carburetor and there is no warm-up period for the unit, in that its zone is already heated by the time a cold mixture is applied thereto. Moreover, even though the flow rate of the cold fuel/air mixture passing through the unit increases as the vehicular speed increases, the oven-effect of the metal casing is such as to raise the temperature of this mixture to an extent promoting vaporization. Because the unit makes it possible to fully exploit the fuel fed into the engine, the formation of carbon deposits in the cylinders with continued use is minimized, and one not only gains an improvement in fuel efficiency but also in engine performance.

The heater and plate oven are adapted to elevate the temperature of fog F to a level conducive to the full volatilization thereof by the time the fog enters the combustion chamber. In other words, instead of solely relying on heat obtained by absorption in the course of passage to the combustion chamber, the cold mixture is heated before entering the passage, thereby producing a warm fog and promoting full volatilization thereof.

It will be appreciated that a unit operating on the same principles may be constructed so that it can be interposed in the conduit of an oil-burning domestic or industrial furnace or any other device in which a fuel is mixed with air and is atomized and heated by the unit to provide an inflammable gas which is ignited in a combustion chamber. Consequently, the unit is also useful in reducing atmospheric pollution as a result of oil burner operations.

Actual Embodiment

Referring now to FIGS. 2 to 5, there is shown an atomizing unit in accordance with the invention of the dual assembly type, the unit comprising a permeable assembly 25, a plate 26 and upper and lower gaskets 27 and 28.

Permeable assembly 25 consists of a parallel pair of oblong screens 29 and 30 formed by wire mesh or grids, preferably woven of stainless steel wire. Other non-reactive metals of high thermal conductivity, such as titanium wire, may be used in fabricating the screen. The two meshes are identical and preferably have a mesh size of about 20 to 24 holes per line inch in order to introduce a restriction to flow whose preferable impedance is approximately 15 to 20%.

Heater element 31, which is sandwiched between the parallel screens 29 and 30, is formed of a resistance filament, such as Nichrome wire (a nickel-chromium alloy), which is sinuously shaped to define a pair of heater sections 31A and 31B and a connecting loop 31C. The portions of the wire in each heater section are in parallel relation. The warp and woof wires of the two screens 29 and 30 are aligned with each other so that the interstices thereof form holes which are in alignment. The assembly is held together by rivets 32 and 33, preferably formed of stainless steel, the rivets passing through the centers of the heater sections. The heater wire terminates in leads $l_1$ and $l_2$ which are connected to lugs $L_1$ and $L_2$.

The heater wire, whose gauge is preferably 25 mils, is protectively ensheathed and electrically isolated from the screens by a coating of flexible film material of high thermal conductivity which is electrically insulating. This coating may be applied to the wire by a spray or dip technique. The preferred coating material is a film of polyimide material such as "Kapton" manufactured by the DuPont Co., the film being about 4 mils thick. Polyimides have high temperature stability up to 1000° F. and good wear characteristics at high temperatures as well as possessing excellent electrical insulating properties. Hence flexing and vibration of the heater wire in the course of operation will not affect the insulation thereon, for the insulation will flex with the wire and remain bonded thereto.

Assembly 25 is seated within a cavity 34 formed in the top face of plate 26, the contour of the cavity conforming to the oblong shape of the assembly. Plate 26, which is fabricated of aluminum, stainless steel or any other metal which is non-reactive with the air-fuel mixture and has good heat sink characteristics, is provided with a pair of flow passages $P_1$ and $P_2$ which register with the dual carburetor flow conduits.

Heater section 31A and the area of screens 29 and 30 associated therewith define an atomization zone that restricts flow in passage $P_1$, while the heater section 31B and the area of screens 29 and 30 associated with this section define a like atomization zone that restricts flow in passage $P_2$ in the manner previously described in conjunction with FIG. 1.

Heater lead wire $l_1$ goes to the positive terminal of the power source and must therefore be insulated from metal plate 26. Lead $l_1$ therefore passes out of plate 26 through an insulating sleeve 35 which is received within a bore 36 formed in the plate. Lead $l_2$ goes to the negative or ground side of the power source and hence is forced into a slot 37 formed in the metal plate to make a connection therewith. Plate 26 is provided adjacent its corners with bores to receive the mounting bolts which pass through corresponding bores in gaskets 27 and 28. These gaskets serve as thermal insulation to render the plate effective as an oven chamber, only significant heat loss from the exterior of the plate being along the relatively narrow edge thereof.

The resistance of the heater element is such that with 14.5 volts applied thereto, which is the usual output of the vehicle's generator, it draws a current of 3 amperes, so that its wattage is 43.5. The heater is designed to heat the atomization zone created by the narrow space between the upper and lower screens to a temperature of about 550° to 650° F. in the unloaded state; that is, in free air at ambient temperature without a cold gas-air mixture passing through the unit.

As pointed out previously, the gas-air mixture generated by the carburetor is forced through the atomization zone, which is adapted to restrict flow therethrough with an impedance of about 15 to 20%. Because the temperature of this mixture at the input side of the unit is close to 0° F., the transfer of heat to this mixture in the course of its restricted flow through the zone greatly reduces the pocket temperature.

We have found that for the unit to be effective, the heat supplied to the cold mixture must be sufficient to raise its temperature to a level falling within a broad range of about 90° to 220° F. Moreover, we have found that a heater arrangement producing a zone temperature in the loaded state in the narrow range of about 150° to 180° constitutes the optimum working conditions for developing a warm fog at the output side of the unit. The screen wires which intercept the fuel droplets in the mixture act to dissect and atomize these droplets to create the desired fine mist or cloud.

Thus in lieu of a cold mixture of relatively coarse gasoline droplets in the air streaming into the intake manifold of the engine, the unit functions to feed therein a warm fog in which minute fuel particles are suspended in air in a vortex-like pattern. This is highly conducive to the total vaporization of the fuel entering the combustion chamber and its full ignition thereof.

Because of the low wattage of the heater, the current drawn from the battery is not much greater than that of a car light so that in practical terms the load imposed by the unit on the battery is insignificant. And because the fuel is raised by the unit to a temperature well below its ignition point, there is no danger of explosion outside of the combustion chamber.

The construction of a dual-assembly atomizer unit as shown in FIGS. 2 and 5 is essentially the same as the single assembly unit shown in FIG. 1, the dual assembly unit having spaced screens and a heater element placed therebetween to form a two-section permeable assembly, each section of which is similar to that in the single assembly unit.

In installing the dual-assembly unit, one simply places it over the intake manifold before mounting the carburetor thereover. The carburetor has a flange whose rectangular formation matches that of the intake manifold and is provided with corner bores to receive the mounting bolts. The carburetor is secured in place by nuts threadably received on the bolts, thereby clamping the rectangular atomizer unit between the carburetor and the intake manifold.

The operation of this dual assembly unit is identical to that of the single assembly unit and functions to convert the cold gas-air mixture generated by the carburetor into a warm fog having a vortex-like pattern conducive to total vaporization and full ignition in the engine combustion chambers.

While there have been shown and described preferred embodiments of fuel atomizing units, it will be appreciated that many changes and modification may be made therein without, however, departing from the essential spirit of the invention. Thus instead of making the plate forming the oven of metal, it may be molded of a synthetic plastic material, preferably one having relatively high thermal conductivity characteristics, the plastic plate being used in conjunction with a metal gasket acting as a heat sink, below which is a gasket of thermal insulation material.

I claim:

1. An atomizing unit interposable in a conduit which feeds a relatively cold mixture of fuel droplets dispersed in an air stream at a varying flow rate to a combustion chamber for ignition therein, said unit acting to effect vaporization of said mixture before it enters said combustion chamber and comprising:

A. a metal plate fabricated of a material which is non-reactive with said mixture and possessing heat sink characteristics, said plate having a flow passage which registers with said conduit, said plate having a cavity therein;

B. a permeable assembly seated in said cavity and constituted by a pair of parallel planar mesh screens having an electrical heating element in the space therebetween to define an atomization zone which restricts the flow of said mixture through said passage, said screens intercepting and dissecting said droplets to develop in the output of the unit a fog-like suspension of minute particles in air, said screens having a mesh size introducing a restriction to flow whose impedance is at least about 15%;

C. a pair of gaskets formed of thermal insulation placed above and below said plate to render said plate effective as an oven chamber having a relatively stable temperature which surrounds said zone; and D. means to energize said element to heat said zone to a temperature level exceeding about 550° F. in the absence of said cold mixture to cause said fog in the presence of said mixture to attain a temperature level lying above about 150° F. to promote vaporization thereof, said oven chamber maintaining said temperature level despite said variations in flow rate.

2. A unit as set forth in claim 1, wherein said mixture is fed through a pair of conduits and said plate has a corresponding pair of flow passages, said assembly having a pair of atomization zones cooperating with said passages.

3. A unit as set forth in claim 1, wherein said mesh screens are woven of stainless steel wire.

4. A unit as set forth in claim 3, wherein said screens have a mesh size of about 20 holes per inch.

5. A unit as set forth in claim 1, wherein said element is formed by a sinuously shaped resistance wire defining an array of parallel wire sections in a plane perpendicular to the direction of flow.

6. A unit as set forth in claim 5, wherein said screens are held together by a rivet which passes through the space between the wire sections.

7. A unit as set forth in claim 1, wherein said plate is made of aluminum.

8. A unit as set forth in claim 1, wherein said gaskets are made of asbestos.

* * * * *